United States Patent
Baker et al.

(10) Patent No.: US 7,164,622 B2
(45) Date of Patent: Jan. 16, 2007

(54) ACOUSTIC PROPAGATION DELAY MEASUREMENTS USING TRANSMISSION OF KNOWN BROAD BANDWIDTH WAVEFORMS

(76) Inventors: Barry B. Baker, 7 Merry La., Gales Ferry, CT (US) 06335; Richard D. Haskell, 6 Drawbridge West, Gales Ferry, CT (US) 06335

( * ) Notice: Subject to any disclaimer, the term of this patent is extended or adjusted under 35 U.S.C. 154(b) by 202 days.

(21) Appl. No.: 10/937,361

(22) Filed: Sep. 10, 2004

(65) Prior Publication Data
US 2005/0058023 A1   Mar. 17, 2005

Related U.S. Application Data

(60) Provisional application No. 60/501,856, filed on Sep. 11, 2003.

(51) Int. Cl.
*H04B 11/00*   (2006.01)
(52) U.S. Cl. ..................................... 367/134

(58) Field of Classification Search ................. 367/1, 367/130, 127, 90, 134
See application file for complete search history.

(56) References Cited

U.S. PATENT DOCUMENTS 5,012,452 A * 4/1991 Johnson et al. ............. 367/1

* cited by examiner

*Primary Examiner*—Dan Pihulic

(57) ABSTRACT

A system and method in which one or more acoustic projectors transmit broad bandwidth waveforms having known characteristics, and one or more acoustic receivers detect the transmitted waveforms, with the measurement of a propagation time from the projectors to the receivers being based on knowledge of the transmitted waveforms. The measurements are performed such that there is a low probability that other third party receivers will detect the transmission. The measurements may also be performed in an environment supporting multiple propagation paths. The system and method may further measure the Doppler shift induced by relative motion between the acoustic projector and the acoustic receiver.

11 Claims, 9 Drawing Sheets

This measured propagation delay information was combined with an estimate of the local speed

ACOUSTIC PROPAGATION DELAY MEASUREMENTS USING TRANSMISSION OF KNOWN BROAD BANDWIDTH WAVEFORMS

RELATED APPLICATIONS

This application claims priority from U.S. Provisional Patent Application No. 60/501,856 filed Sep. 11, 2003, which is hereby incorporated by reference in its entirety.

STATEMENT OF GOVERNMENT INTEREST

This invention was made with government support under contract N00024-00-C-4062 awarded by the U.S. Navy. The government has certain rights in the invention.

BACKGROUND OF THE INVENTION

1. Field of the Invention

The present invention relates to acoustic signal processing with adaptations for electromagnetic processing ranging from Extremely Low Frequency (ELF) to Ultra Violet (UV).

2. Description of the Related Art

The desire to achieve superior performance in acoustic data acquisition systems has been partially met by the construction of large arrays of acoustic sensors. Practical engineering constraints for portable sensor arrays have lead to the design and construction of flexible sensor array structures. Optimal processing of the data collected from flexible arrays of sensors requires detailed knowledge of the time variant positions of the sensors in the array. Some of the largest flexible arrays, and some of the largest rigid arrays, are now large enough that the non-isotropic characteristics of the environment are of concern when processing data from the sensor array. For example, with these large arrays, acoustic signals may propagate through a complex ocean environment with varying temperature, pressure and salinity characteristics, as well as differing physical contours and obstructions. Each of these parameters can affect the path, strength and condition of the transmitted and received signals. Accordingly, signal processing of such large array systems must account for the differing properties of the environment along axes in all directions.

For commercial systems some of this positioning and environmental data has been collected using acoustic projector to acoustic receiver propagation delay measurements using pulsed acoustic waveforms. These pulsed waveforms can preclude the simultaneous arrival of signals from multiple propagation paths, and can provide minimum power requirements for the acoustic projectors. Simple waveforms, such as pulsed CW and FM slides, minimize the required computational requirements for the delay measurements.

Military units also use large acoustic sensor array structures to maximize acoustic sensor performance. These systems also require sensor location and environmental data to support acoustic signal processing of the sensor array data. For obvious reasons, many of these military systems also desire that the sensor array not be detected by opposing forces. However, the traditional waveforms used for propagation measurements are not optimized to minimize the risk of detection by opposing forces. Most traditional solutions are challenged by the evolution of system capabilities. For example, the utility of very high frequency transmissions is reduced by scattering and absorption of the transmitted and received energy by the sensor array structure. The security provided by the environmental scattering and absorption between the projector and the sensor system employed by opposing forces is of decreasing utility as tactical engagement ranges shorten. The difficulty of opposing forces detecting very short transmissions (of a few cycles in duration) is now reduced by the falling cost of signal processing hardware. The use of short duration waveforms mimicking natural transient energy (such as biologic sources) has its own set of engineering and counter detection constraints.

Both the force deploying the sensor array, and the opposing force, desire to detect and classify (recognize as of interest) the energy transmitted to support the required propagation delay measurements. The signal processing advantage afforded the force deploying the array is knowledge of the transmitted waveform. This advantage should therefore be maximized. In addition, it is a basic tenet of search theory that detections are based on differences between a signal and background noise. The primary factors are Signal-to-Noise Ratio (SNR) and Recognition Differential. Traditional waveforms (CW pulses, FM slides, and the like) are frequently chosen because they are qualitatively distinct from background noise typically encountered in the marine environment, and thus contribute to increased recognition differential, so as to be easily identified by the intended processing system. However, a drawback is they are thus more detectable by an opposing force than a signal of similar SNR that blends with the marine background environment.

SUMMARY OF THE INVENTION

To overcome these and other disadvantages of the prior art, it is an object of the present invention to measure absolute or relative propagation delay from at least one transmitter to at least one receiver.

It is another object of the present invention to operate the transmitter in a manner that minimizes the risk that a third party, with a receiver, will detect the operation of the transmitter.

It is still another object of the present invention to measure propagation delay in environments supporting multiple propagation paths (hereafter referred to as multi-path environments), with corresponding multiple propagation delays.

It is yet another object of the present invention to measure propagation delay for dynamic transmitter/receiver geometries where the propagation delays from the transmitter to the receiver are varying over time.

In embodiments of the present invention, pseudo-random wide band waveforms of at least about one-third octave are transmitted, and the characteristics of the transmitted waveforms are known to the transmitting party, and are thus known to the receiving processor.

In certain embodiments of the present invention, the time of transmission is known to the receiver where a direct measurement of propagation delay from a transmitter to a receiver is desired. However, the time of transmission is not required to measure the relative propagation delay from a transmitter to two different receivers, or from two different transmitters to a single receiver. This feature supports line of bearing estimates from the receiver pair to the transmitter, or from the transmit pair to the receiver. In still other embodiments, measurement is based on the observed change in propagation delay. The accuracy of the present invention may be enhanced by incorporating knowledge of the environment in which it is to be used, including possible physical dimensions.

In one particular embodiment, one or more acoustic projectors transmit known acoustic waveforms, and one or more acoustic receivers detect the transmitted waveforms. Measurement of the propagation times from the projectors to the receivers is based on knowledge of the characteristics of the transmitted waveforms. The transmitted acoustic waveforms are greater than about one-third octave in bandwidth, and are transmitted continuously or nearly continuously during periods for which measurements are required, with the objective to perform measurements with a low probability that other third party receivers will detect the transmission, and/or upon detection of the transmission, that the transmission not be identified as a man-made energy source.

In another embodiment, one or more acoustic projectors transmit known acoustic waveforms, and one or more acoustic receivers detect the transmitted waveforms. Measurement of the propagation times from the projectors to the receivers is based on knowledge of the characteristics of the transmitted waveforms. The transmitted acoustic waveforms are greater than about one-third octave in bandwidth, and are transmitted at greater than a 20% duty cycle during those periods for which measurements are required, with the desire to perform measurements in an environment supporting multiple propagation paths.

In another embodiment, one or more acoustic projectors transmit known acoustic waveforms, and one or more acoustic receivers detect the transmitted waveforms. Measurement of the propagation times from the projectors to the receivers is based on knowledge of the characteristics of the transmitted waveforms. The transmitted acoustic waveforms are greater than about one-third octave in bandwidth, and are transmitted at greater than a 20% duty cycle during those periods for which measurements are required, and which also includes measurement of the Doppler shift induced by relative motion between the acoustic projectors and the acoustic receivers.

BRIEF DESCRIPTION OF DRAWINGS

The above objects and other advantages of the present invention will become more apparent by describing in detail the preferred embodiments thereof with reference to the attached drawings in which FIGS. 1, 2, and 3 generally provide a comparison of the time lag localization of a matched filter detector for several wide bandwidth transmit waveforms. More specifically.

DETAILED DESCRIPTION OF THE PREFERRED EMBODIMENTS

The present invention will now be described more fully with reference to the accompanying drawings, in which preferred embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1A:
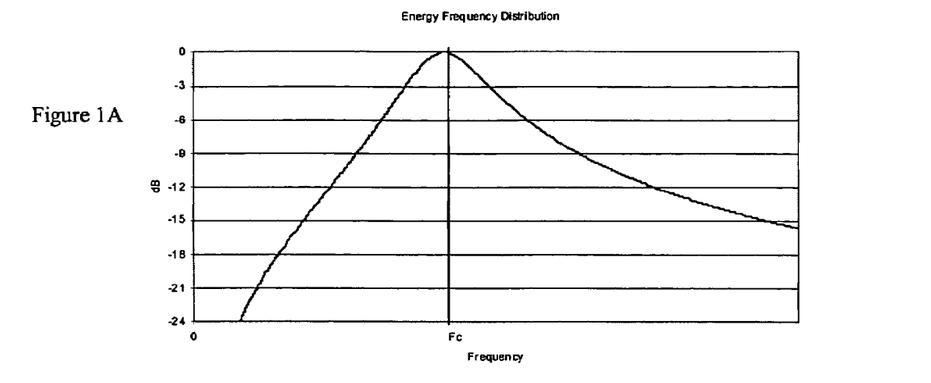
FIG. 1A graphically presents a one-third octave transmit frequency/energy distribution.
Figure 1B:
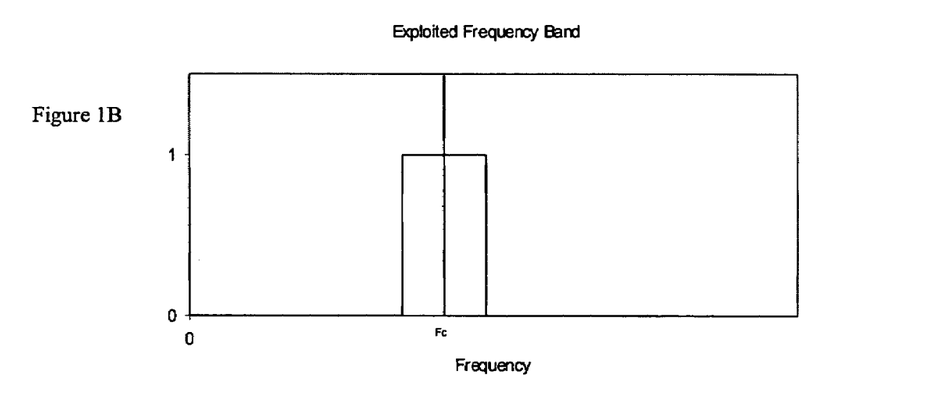
FIG. 1B graphically presents the corresponding whitened, band passed energy distribution of FIG. 1A.
Figure 1C:
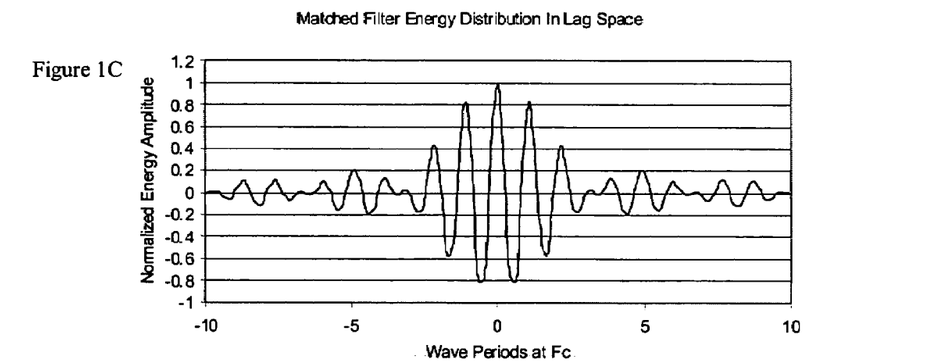
FIG. 1C graphically presents the corresponding replica correlation/time lag distribution of FIG. 1A.
Figure 2A:
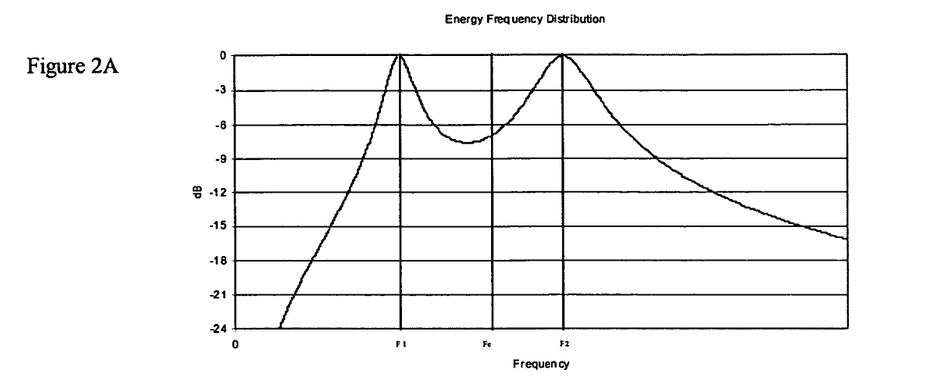
FIG. 2A graphically presents a dual one-sixth octave transmit frequency/energy distribution.
Figure 2B:
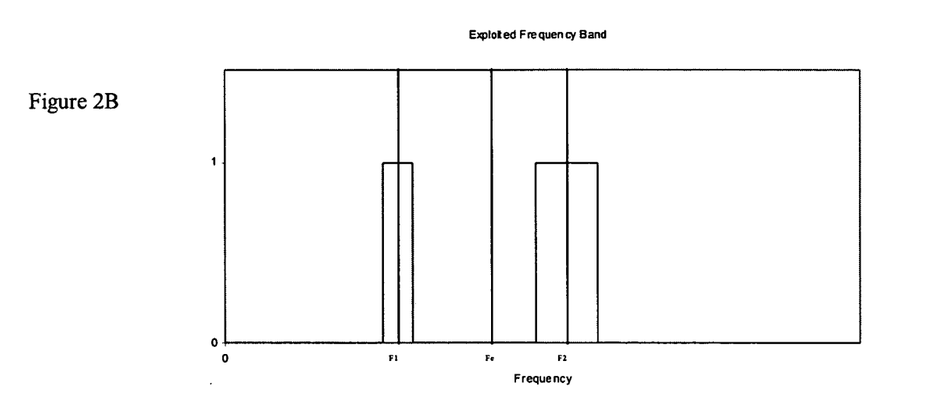
FIG. 2B graphically presents the corresponding whitened, band passed energy distribution of FIG. 2A.
Figure 2C:
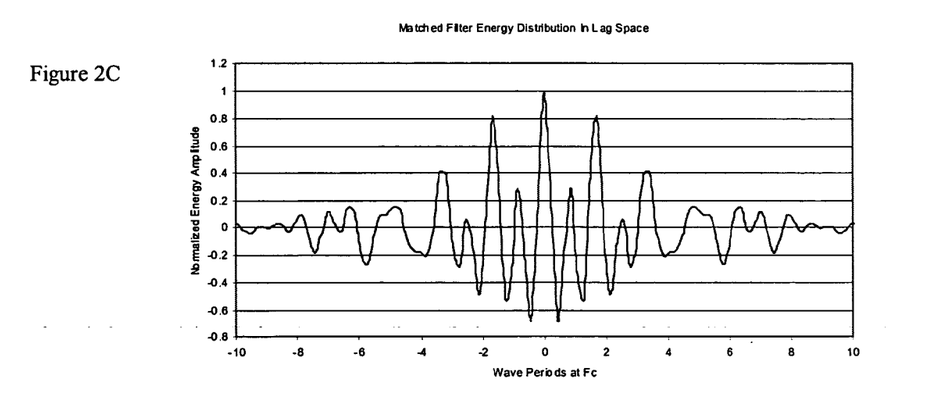
FIG. 2C graphically presents the corresponding replica correlation/time lag distribution of FIG. 2A.
Figure 3A:
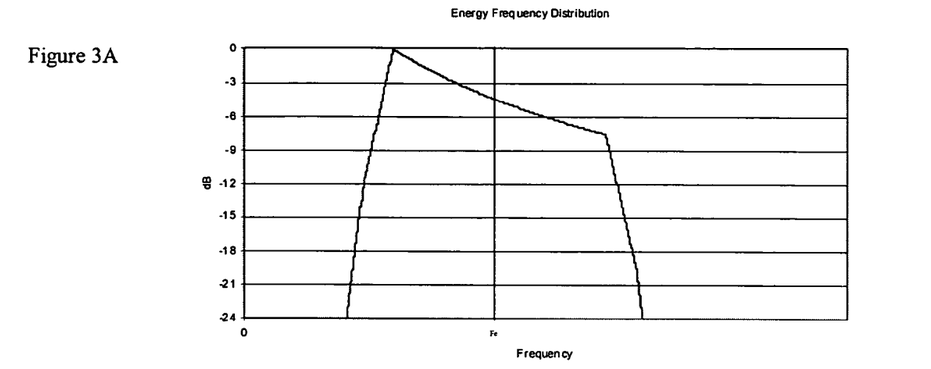
FIG. 3A graphically presents a wider bandwidth transmit frequency/energy distribution.
Figure 3B:
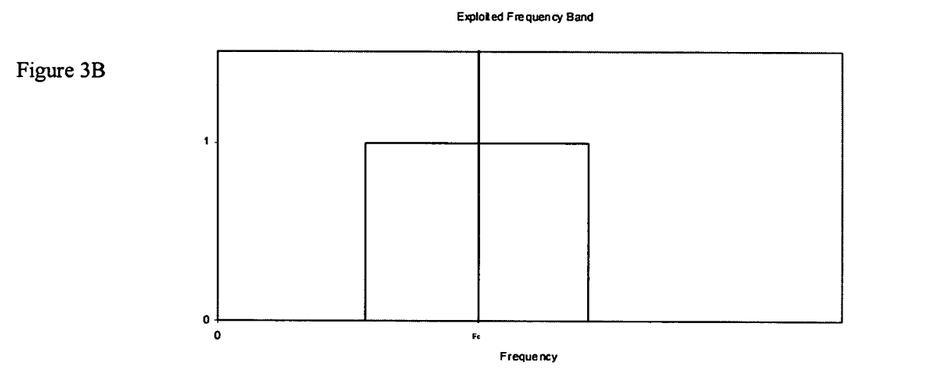
FIG. 3B graphically presents the corresponding whitened, band passed energy distribution of FIG. 3A.
Figure 3C:
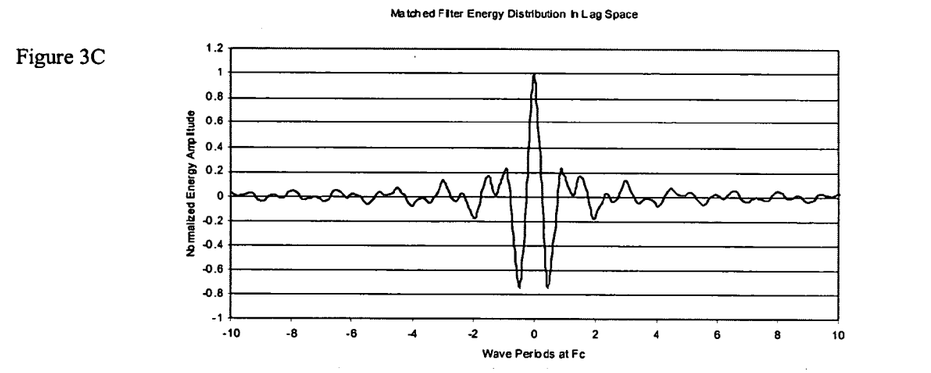
FIG. 3C graphically resents the corresponding replica correlation/time lag distribution of FIG. 3A.

Conventional matched signal processing techniques are sufficient to extract a useful transmission delay estimate from many broadband waveforms. FIGS. 1, 2, and 3 provide a comparison of the time lag localization of a matched filter detector for several wide bandwidth transmit waveforms.

FIG. 1A graphically presents a one-third octave transmit frequency/energy distribution, while FIG. 1B graphically presents the corresponding whitened (i.e., purged of irregular tonal energy), band passed energy distribution of FIG. 1A, and FIG. 1C graphically presents the corresponding replica correlation/time lag distribution of FIG. 1A. FIGS. 1A–1C depict the adequate lag space localization achievable when processing a noise-free received waveform with full knowledge of a wide band waveform of about one-third octave bandwidth arriving from the transmitter. It is well known that an octave is the interval between two frequencies (as in an electromagnetic spectrum) having a ratio of 2 to 1. Known frequency/phase dispersion of the transmitted waveform can readily be included. Unknown frequency/phase dispersion will result in a dispersion (the scattering of the values of a frequency distribution from an average) of the lag space localization.

FIG. 2A graphically presents a dual one-sixth octave transmit frequency/energy distribution, while FIG. 2B graphically presents the corresponding whitened, band passed energy distribution of FIG. 2A, and FIG. 2C graphically presents the corresponding replica correlation/time lag distribution of FIG. 2A. FIGS. 2A–2C depict the adequate lag space localization achievable when processing a broadband waveform of about one-sixth octave bandwidth at a mid-frequency F1 and of about one-sixth octave bandwidth at mid-frequency F2 where F2 is twice F1. This illustrates that broadband waveforms sparse in the frequency domain are also suitable for propagation delay measurement. That is, a total bandwidth of only about one-third octave is adequate even when split into multiple sub-bands over a wide frequency range. The cross-correlation peak is still well defined with adequate side-lobe suppression.

FIG. 3A graphically presents a wider bandwidth transmit frequency/energy distribution, compared to those shown in FIGS. 1A and 2A. FIG. 3B graphically presents the corresponding whitened, band passed energy distribution of FIG.

3A, and FIG. 3C graphically resents the corresponding replica correlation/time lag distribution of FIG. 3A. FIGS. 3A–3C depict the lag space localization of a wider bandwidth waveform selected both for improved lag space localization, and reduced detectability by a third party (hereafter referred to as counter-detection).

Note that while certain frequency/energy distributions are illustrated herein, any of these frequency/energy distributions, and any of a very large family of alternate frequency/energy distributions, might be selected for transmission, with selection based in part on certain criteria, including (i) the characteristics of the available transmitter and receiver capabilities; (ii) the dispersion characteristics of the transmission media; and (iii) the projected processing capabilities of the counter-detection threat. Note further that the above criteria are presented by way of example, and not limitation.

Figure 4:
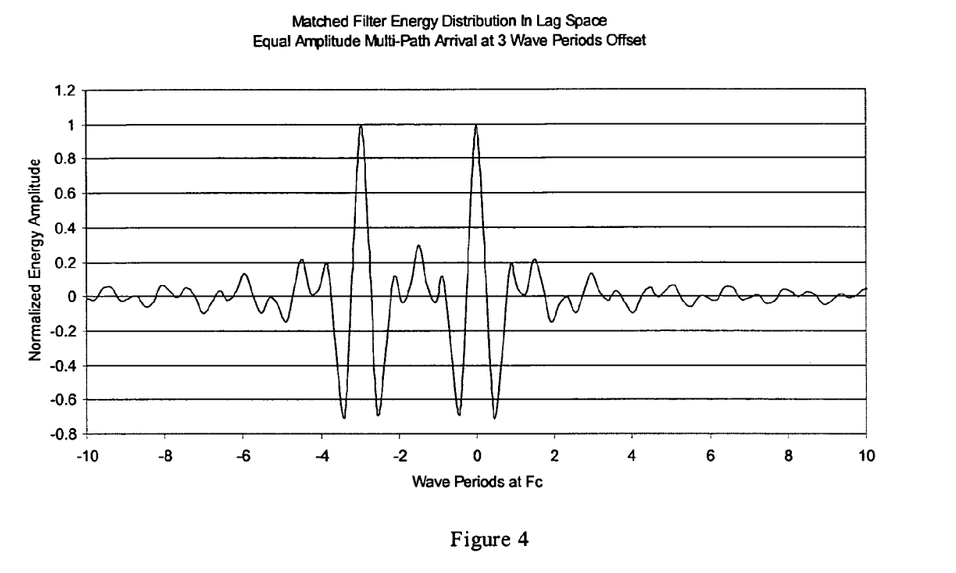
FIG. 4 graphically presents the perturbation introduced by an equal amplitude multi-path arrival at a differential lag of three (3) wave periods at the processed center frequency.

The well-localized nature of the lag space estimate makes this processing useful even in adverse environments supporting multiple propagation paths. FIG. 4 depicts the lag space localization of the received signal in an environment supporting two propagation paths with a difference in propagation delay of only three wave periods at the center frequency for the transmitted frequency/energy distribution from FIG. 3. As illustrated, the multiple paths cause minimal distortion from the single path result of FIG. 3. Alternative schemes for operating in an environment with multiple propagation paths may employ short bursts of energy (less than about 20% duty cycle) in an attempt to achieve non-overlapping reception of the waveform over distinct acoustic paths.

Where measurement of propagation delay for a single path is required, the primary additional processing burden is in selecting which of the multiple measured propagation delays is the propagation delay of interest. Some form of prior knowledge would normally suffice. Examples could include selection of the shorter or longer propagation delay, or selection of the propagation delay that responds as desired to changes in the transmitter or receiver geometry. Alternatively, the objective might be to detect and measure the propagation delay for all available paths.

Low transmitted energy and minimal signal-to-noise (SNR) at all frequencies is a design objective when designing for low probability of counter-detection. Normally the transmitted energy at all frequencies should be lower than the radiated energy from other components in the system. For a submarine towed array system, transmitted energy at all frequencies should be lower than the radiated noise from the submarine. The transmitted waveform may also include energy at frequencies where the signal-to-noise ratio is degraded, and deliberately excluded by the matched signal processing.

The aggregate of frequency bands where energy is transmitted and used in the measurement of propagation lag is hereafter referred to as the exploited frequency spectrum. Useful measurement accuracy is readily obtained when the signal-to-noise ratio at the output of the matched signal processing over the exploited frequency spectrum is at least +6 dB. Only half of the noise is in quadrature to the signal, making the signal-to-quadrature noise ratio +9 dB. The one sigma measurement accuracy is then approximately $1/15$ of the wave period of the center frequency of the exploited frequency spectrum. When the signal-to-noise ratio at the input to the match signal processing is reasonably uniform, the signal-to-noise ratio at the output of the matched signal processing can be approximated as the signal-to-noise ratio at the input to the matched signal processing scaled by the ratio of the exploited bandwidth to the measurement bandwidth. Wide exploited frequency bandwidth and long coherent processing intervals therefore reduce the transmitted spectral energy level required for measurement accuracy.

The useful coherent processing interval is limited by the dynamics of the propagation delay between the transmitter(s) and receiver(s). Longer coherent processing intervals can be maintained for measurement geometries with significant propagation delay rates (Doppler) by Doppler compensating either the transmit waveform, the receive waveform, or both. For example, the received waveform might by Doppler compensated for a known receiver velocity. An unknown transmitter velocity might be compensated for by Doppler compensating the transmit waveform for a multiple of hypotheses of transmitter velocity. The number of transmitter velocity hypotheses can be reduced based on knowledge of the observed change in propagation delay between the last two (or more) propagation delay measurements. The observed change in propagation delay can also be used to develop accurate measurements of Doppler. In multi-path environments the observed Doppler and Doppler compensation can be different for different propagation paths.

The use of matched signal processing to combine knowledge of the transmitted waveform with data collected at the receiver to estimate propagation delay is a feature of the present invention. However a variety of numerical tools suitable to this purpose exist in the conventional art. A few of these tools include direct correlations and covariances at multiple lag estimates, cross-correlations and cross-covariances, convolutions, and inverse frequency transforms of mean complex cross-spectra. Each of these tools is further realizable in a variety of numerical algorithms. Further, the transmit and receive waveforms are subject to various conventional practices including frequency domain and time domain shading, impulse energy cancellation and overlapped and gapped coherent processing data blocking.

Figure 5:
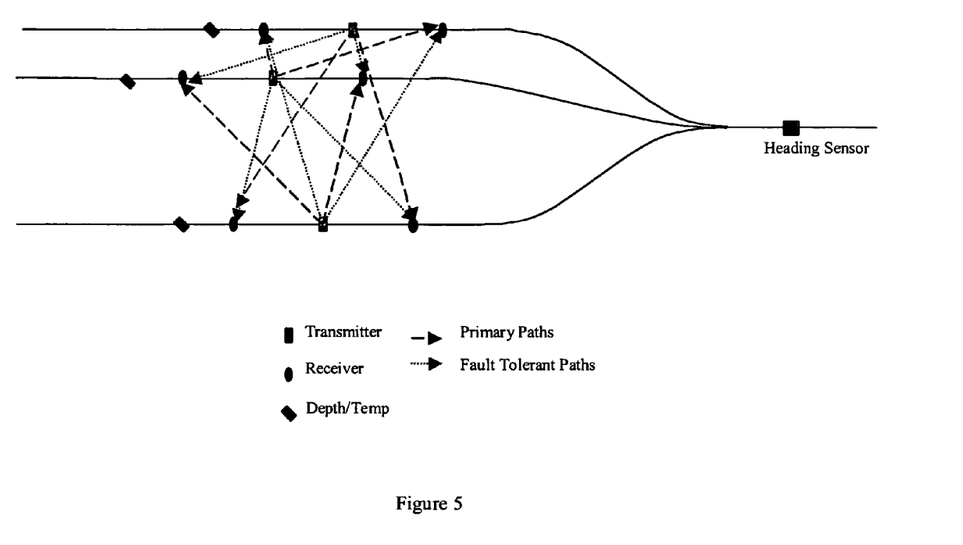
FIG. 5 is a simplified schematic overview of an exemplary embodiment of the present invention.

The embodiments of the present invention will now be described in greater detail with reference to FIGS. 5 through 9. The fabricated and tested prototype system 50 of the present invention is depicted in FIG. 5. This system was constructed to measure the dynamic shape of a towed multiple line acoustic array. The system 50 comprises transmitters 51, 54, 57 and receivers 52, 53, 55, 56, 58, 59 arranged along three towed array lines 62, 64, 66.

Figure 6:
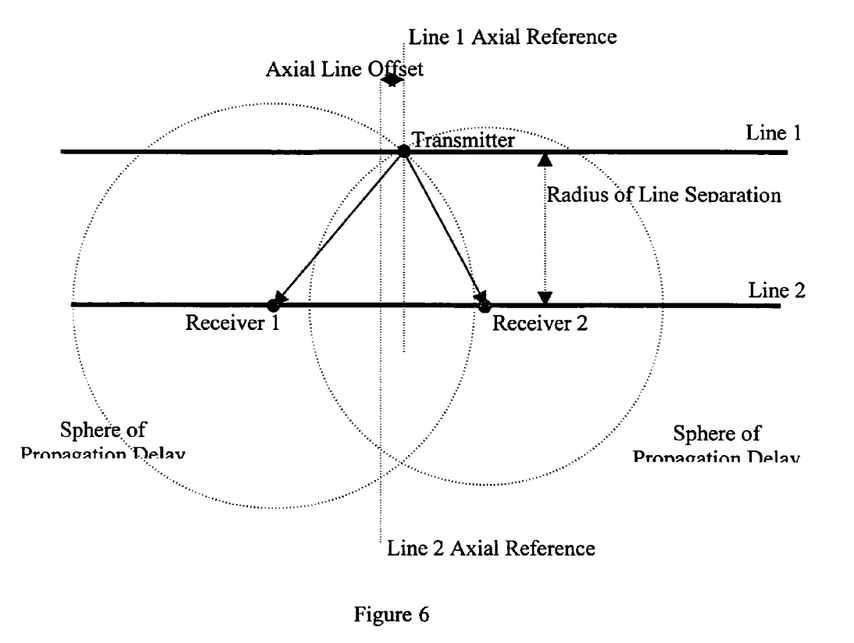
FIG. 6 is a diagram of a basic transmitter and receiver pair used for towed line array geometry measurement.

Frequent, accurate measurements of array separation were required. The system 50 was required to be accurate to one-fourteenth ($1/14$) of a wavelength of the center frequency of the transmitted waveform, and be difficult to detect, or if detected, difficult to classify. The invention was fabricated and its performance was demonstrated statically and dynamically under tow. The acoustic projector and receiver placement was designed to support measurement of the relative positions of three towed lines (62, 64, 66) both axial and perpendicular to the direction of tow, although it can be appreciated by those skilled in the art that other relative positions and tow line characteristics are considered to be within the scope of the present invention. The propagation delay measurements for the transmitter (51, 54, 57) in one line to the pair of receivers (52/53, 55/56, 58/59) in a second line are illustrated in FIG. 6.

This measured propagation delay information was combined with an estimate of the local speed of sound derived from measured temperature and pressure data, and estimated salinity to produce estimates of propagation distance. Combining the two measured propagation lengths with known separation distance between the two receivers supports the calculation of the lateral and axial offset between the two lines. This process was repeated for each line pair. Combining the line separation data with pressure and heading data supports the line array shape estimation required for tactical employment of the Multi-Line Array. The general processing flow for this system is set forth in FIG. 7.

Figure 7:
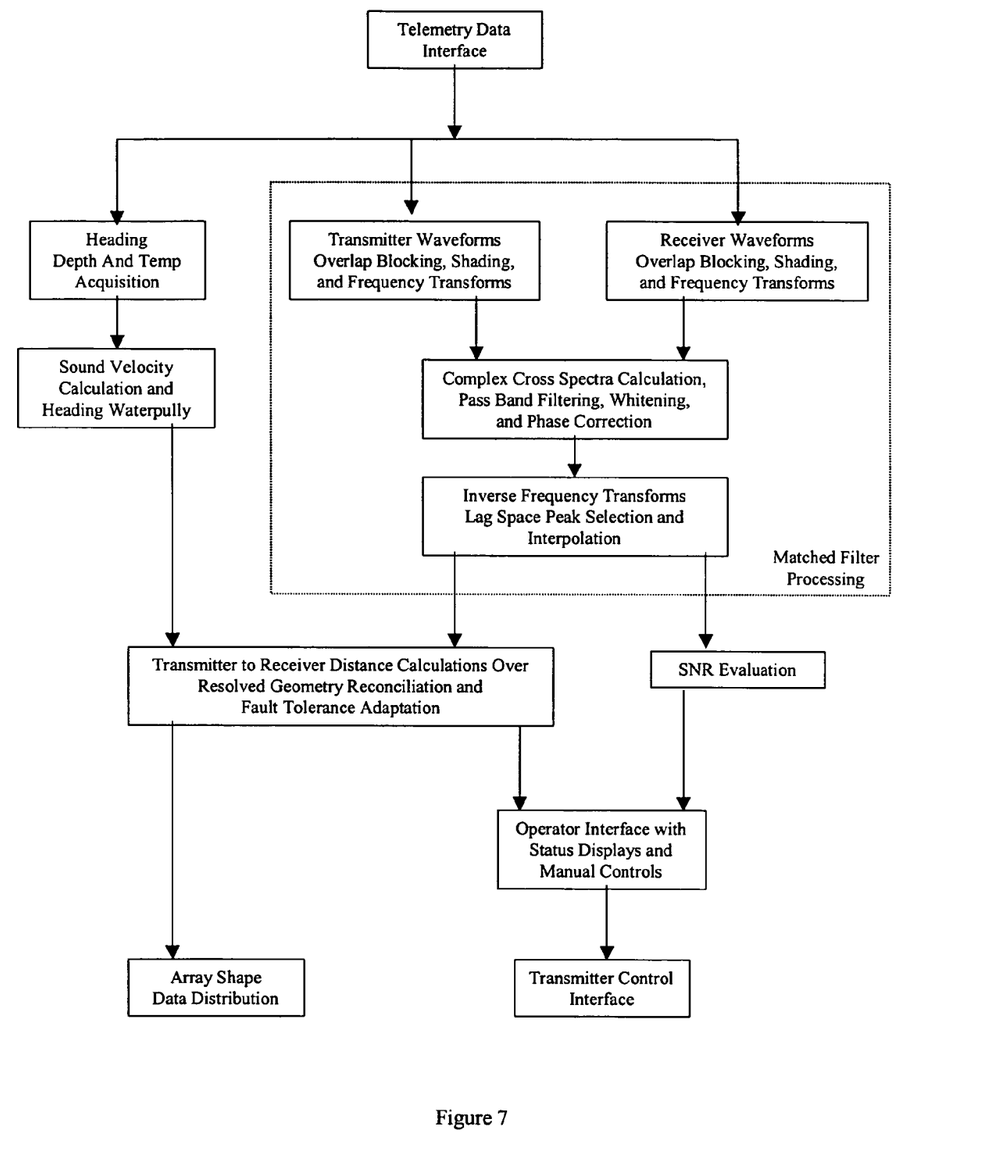
FIG. 7 is a flow diagram of the cross-correlation and relative position estimation process.
Figure 8:
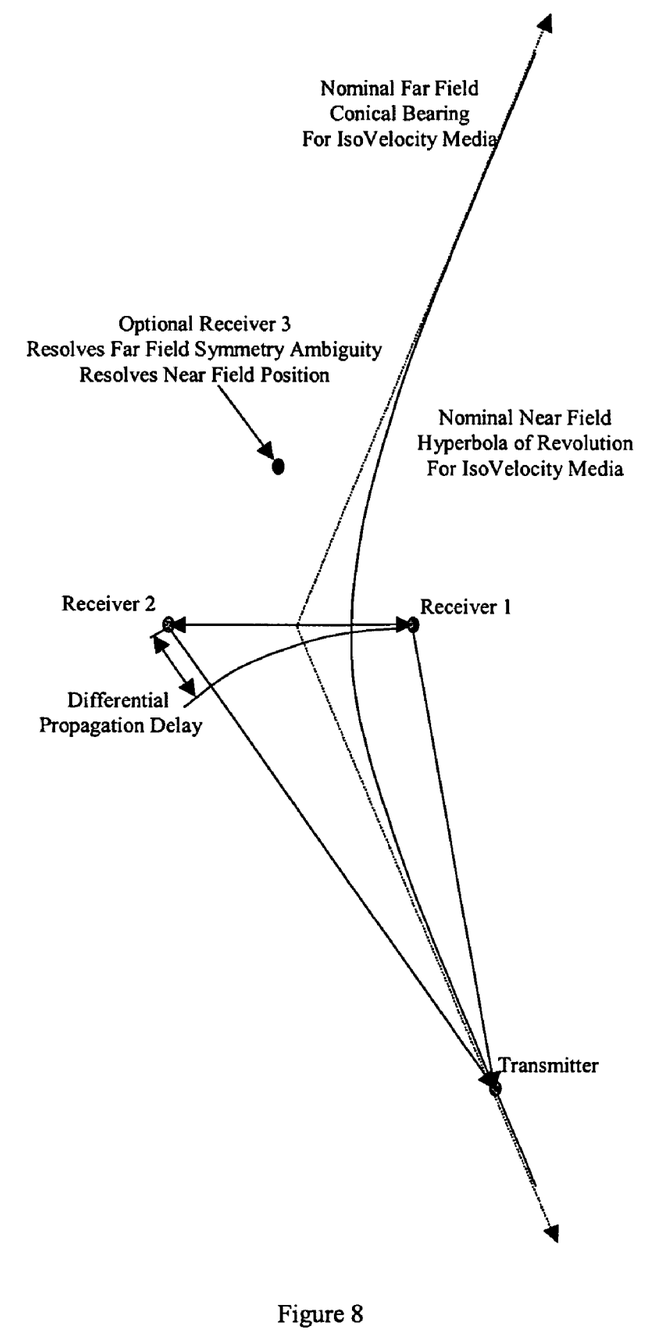
FIG. 8 is a diagram of the hyperbolic line of position (far field line of bearing) developed using a transmitter and a pair of receivers.
Figure 9:
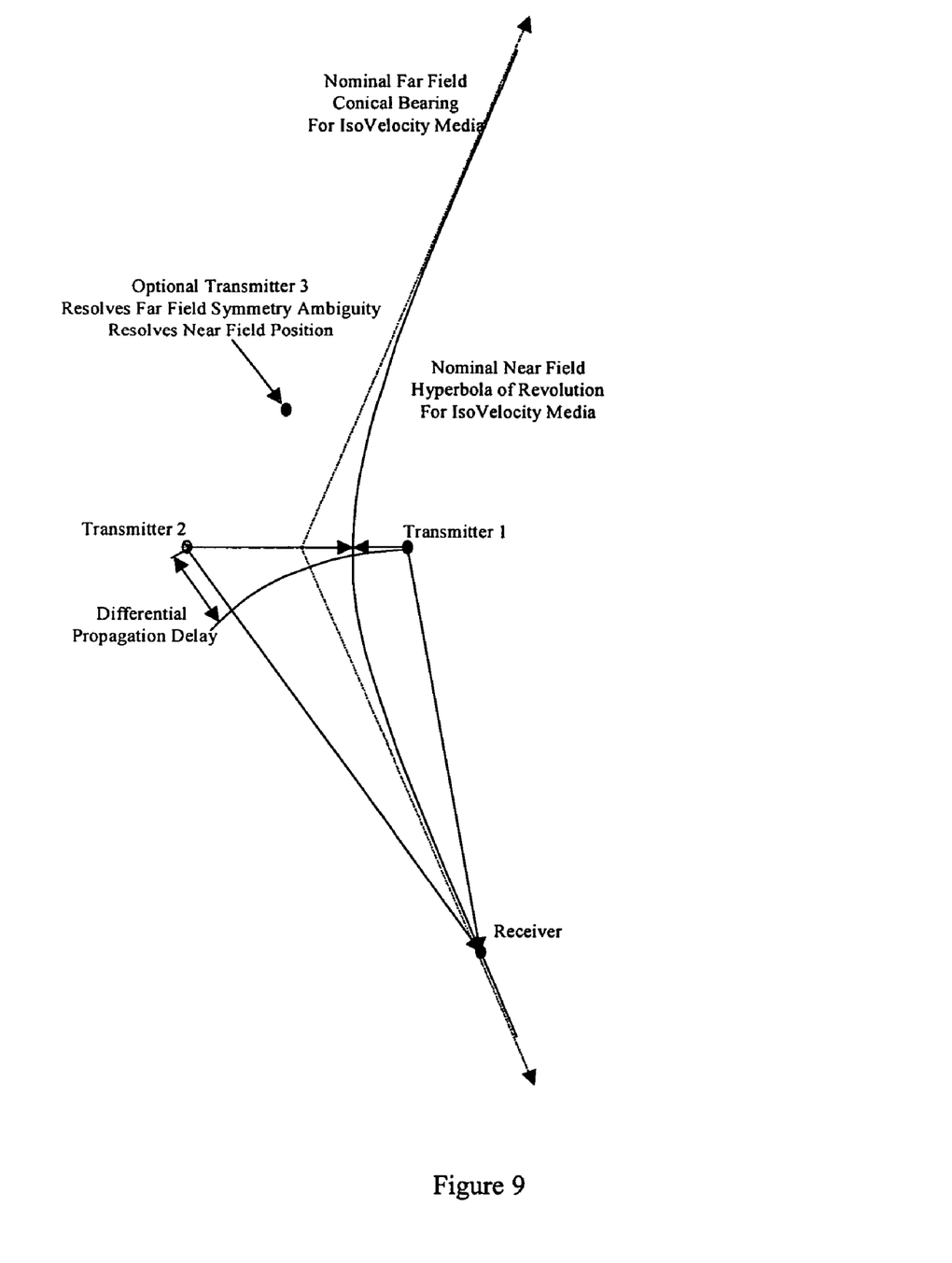
FIG. 9 is a diagram of the hyperbolic line of position (far field line of bearing) developed using a pair of transmitters and a receiver.

Referring to FIG. 7, in step 70 the telemetry data was transmitted over an Asynchronous Transmission Mode (ATM) network from three acoustic arrays with a common clock. The data were partitioned into three blocks: Non-Acoustics (heading, depth, temperature) (step 72), Transmitter Waveforms (step 73), and Receiver Waveforms (step 74). Non-Acoustic data were used to estimate local sound speed, and to determine array shape variation over time (step 75). The Transmitter and Receiver waveforms were diverted to the Matched Filter Processor (step 80) indicated by the dotted enclosure in FIG. 7. The Transmitter Waveforms were extracted from the transmitter drive circuitry at the time of transmission, and represented an accurate replica of the in-water waveform. The Receiver Waveforms were a superposition of all Transmitter Waveforms and the local ambient noise field.

Referring back to steps 73 and 74, program control was blocked at the beginning of the loop until a complete data block became available. A data block consisted of a synchronized set of 4096 points from each of the receivers and from each transmitter. Data preparations included concatenating the new data time series with the preceding corresponding series to generate 8192 points in each series, resulting in 50% data overlap. The full series were windowed with cosine-squared shading and transformed to the frequency domain.

In step 82, sensor pairs were then beamformed in the frequency domain to form a single spectral representation of each pair of sensors, and two spectral representations of each pair of transmitters, forming a two directional set. The transmit spectra were corrected for phase distortion in the processing stream, band-pass filtered to the pre-selected processing frequency band, and conjugated. The transmit conjugates were then complex-vector multiplied by selected receive spectra to form cross-spectra. The cross-spectra were added over the processing interval.

In step 84, at the end of the processing interval, the cross-spectra were inverted to generate cross-correlation time series with the maximum cross-correlation peak corresponding to the acoustic travel time between source and receiver. Each cross-corellogram was searched for a maximum, and then interpolated to refine the peak-time estimate. The current peak-time estimate was then compared with the recent history of peak-time estimates. Inconsistent peak-time estimates were discarded before the results were passed out of the Matched Filter Process 80.

The remaining tasks (step 86) indicated in FIG. 7, outside the Matched Filter Processor 80, are designed to utilize the Acoustic Distance Measurements in support of an adaptive acoustic beamformer. The time delays were converted to distance using the estimated sound speed, and the relative location of each array determined from a redundant set of transmitter to receiver distances. The measurement results were filtered to remove extraneous points and combined with the non-acoustic data to form a complete shape estimate of the three arrays. Cross-correlation Signal-to-Noise was examined to assist in estimating measurement error. Useful information was presented to the operator, with periodic results forwarded to the beamformer process via the ATM network.

Those skilled in the art will appreciate that the invention may be adapted to any hydrophone and transducer that have stable frequency phase characteristics in the pass band selected for the application of the invention, and that the measured propagation delay may then be used in a variety of applications.

Each acoustic projector in the prototype transmitted a unique pseudo random broadband waveform with an energy/frequency content as depicted in FIG. 3. The invention will function properly in any frequency band that exceeds about one-third octave. Waveform energy/frequency shaping in the exploited frequency band and the roll-off shoulders outside the exploited frequency band were selected to reduce signal detectability. The center frequency for the prototype was selected to conform to the mechanical and telemetry properties of the instrumented multiple-line array. A bandwidth of greater than one octave provided robust performance in environments supporting multiple propagation paths, although as stated above, the invention will function on bandwidths of about one-third octave or greater. Currently, the upper limit is in excess of four octaves, with this constraint being imposed by practical considerations of presently available transmitter and receiver design. Those skilled in the art will appreciate that this upper limit may increase over time with continued improvements in transmitter and receiver design, and applicability to such emerging upper limits are considered within the scope of the present invention. The prototype frequency band supported system accuracy requirements, and minimized scattering and absorption of the transmitted energy by the line array materials.

All transmitters were operated continuously, or nearly continuously, to eliminate detectable energy amplitude modulation. This reduced the probability that the transmission would be recognized as man-made. However, the invention is not limited to such an embodiment. The transmission could also be amplitude modulated. In other words, while the present invention describes continuous transmissions desirable for covert operations, the present invention is equally as effective with modulated transmissions, where the transmissions are of sufficient duration, such that transmissions propagated through multiple transmission paths arrive concurrently at a receiver. This is to be compared with waveforms modulated to preclude the simultaneous arrival over multiple transmission paths, which are examples of the conventional art. For example, the objectives of the present invention can be met where the acoustic waveform is transmitted at about at 20% duty cycle or greater during a measurement period.

The transmitted waveforms did not repeat at a stable interval. Waveforms, which repeat at a stable interval, can be processed as a family of harmonic tones at multiples of one cycle per repetition period. This harmonic energy content would provide an indicator that the transmitted energy was man-made. Nearly the same security would be achieved by using a very long repetition interval. Although appropriate for use with the present invention, selecting waveforms that do not repeat at a stable interval is not a requirement of the present invention. Where the repetition interval is short (less than 10 cycles at the center frequency of the transmitted energy), the transmitted waveform becomes a small family of narrow tones. Exploitation of such tones groups to measure propagation delay is recognizable in examples of the conventional art. Where the repetition interval is long (more than 30 cycles at the center frequency of the transmitted energy), the transmitted waveform becomes a large family of tones approximating a broadband transmission, and is a feature of the present invention.

Propagation delay measurements may be obtained with a variety of conventional numerical tools, both analog and digital. Some methods for delay measurement are direct computation of covariance, replica correlation, and convolution. Processing for the prototype was performed using the Inverse Frequency Transform of the Mean Complex Cross-Spectra. The cross-spectra were whitened over the exploited frequency band to minimize the effects of ambient narrow frequency energy sources, and to minimize dispersion of the propagation delay estimation function. The cross-spectra were corrected for the phase/frequency transfer functions for both the transmitter and the receiver. This processing is depicted as the Matched Filter Processing 80 block in FIG. 7.

The use of continuous broadband waveforms to measure propagation delay was validated for multiple projectors and receivers in an environment supporting multiple propagation paths. The prototype invention demonstrated measurements repeatability of $\frac{1}{20}$ wavelength at the center of the exploited frequency band. The ability to determine measurement accuracy was limited by mechanical construction errors also on the order of $\frac{1}{20}$ wavelength at the center of the exploited frequency band.

Tow dynamics supported coherent processing intervals (complex cross-spectra averaging intervals) of about one second. This enabled operation at low transmitted energy levels, with signal levels at the receivers more than 25 dB below ambient noise. Processing at multiple Doppler shifts of the transmitted waveforms was not required, but could be implemented for more dynamic tow geometries.

Measurements supported estimates of both propagation delay, and propagation delay rate. The present form of the invention as described herein used the measurement of propagation delay to determine the physical displacements between towed acoustic array lines with reference to acoustic distance measurement with low probability of third party detection. Those skilled in the art will recognize that the measurement of propagation delay can be used to support a variety of measurement requirements. For some applications, only the fundamental propagation delay is required. Where sound velocity along the propagation path is known, propagation distance can be estimated. Where the propagation distance is known, average sound velocity along the propagation path can be estimated.

In certain embodiments of the present invention, the time of transmission is known to the receiver where a direct measurement of propagation delay from a transmitter to a receiver is desired. However, the time of transmission is not required to measure the relative propagation delay from a transmitter to two different receivers, or from two different transmitters to a single receiver.

Where multiple receivers are available, differential propagation delay time can be used to estimate the direction from the receivers to the transmitter. Where multiple transmitters are available, differential propagation delay time can be used to estimate the direction from the transmitters to the receiver. Where both the physical configuration and sound velocity are known, frequency/phase and frequency/amplitude data for transmitter and receiver elements can be measured in demanding environments, including test configurations normally constrained by multi-path and reflected energy. Observation of the change in propagation delay can be used to estimate Doppler shift and therefore relative speed along the propagation path between the transmitter and receiver. Where multiple propagation paths exist, all such data can be acquired for each of the propagation paths.

The prototype system 50 was used to measure acoustic path travel time under static controlled conditions, and under dynamic tow. In the static test, the RMS of measurements between source and receiver was approximately 7 microseconds. Measurement errors, based on physical measurements of the test structure, were less than 15 microseconds. Under dynamic tow, the measurements were consistent with known separations, and internally consistent between successive measurement epochs. The same processing would distinguish differential acoustic path travel times between multiple receivers or multiple transmitters. The prototype system 50 employs synchronized telemetry to determine absolute acoustic path travel time. Alternative synchronization could be achieved through use of a common time pulse such as provided by the Global Positioning System (GPS). In the case where the transmitted waveform is known but no absolute transmit time hack is available, the difference in propagation delay for the two receivers may be measured and will provide line of bearing information to the transmitter (see FIG. 8). In the case where the transmitted waveform from two transmitters is known but no absolute transmit time hack is available, the differential propagation time for the two transmitters may be measured and will provide line of bearing information from the transmitter (see FIG. 9). In the near-field of three or more transmitters, or three or more receivers, three dimensional tracking is also possible.

Covertness was achieved in the prototype system 50 through minimal source level, an indistinctive waveform, and a very large family of waveforms from which to select. The source level was constrained to be less detectable than the quietest of the platforms that might be required to deploy the host system. When SNR at the receiver was at least −25 dB, useful measurements were obtained from a one second data interval. In addition to the low source level, the waveforms had no distinguishing characteristics. They had no identifiable tonal or temporal characteristics that distinguish them from normal background noise, and no periodic repetition within processing bands that could be used for counter-detection. Additionally, with a large (nearly infinite) family of waveforms that may be selected, it is virtually impossible that a hostile power could obtain knowledge of a specific waveform to enhance its counter-detection capability. The transmit waveforms may be selected just prior to or during an operation, depending on the nature of the synchronization process and covertness requirements.

The accuracy of the present invention may be enhanced by incorporating knowledge of the environment in which it is to be used, including possible physical dimensions.

While the present invention has been described in detail with reference to the preferred embodiments thereof, it should be understood to those skilled in the art that various changes, substitutions and alterations can be made hereto without departing from the scope of the invention as defined by the appended claims.

What is claimed is:

1. A system for acoustic propagation time delay measurement, comprising:
    an acoustic projector for transmitting an acoustic waveform having characteristics known to a transmitting party;
    an acoustic receiver for detecting the transmitted acoustic waveform with the known characteristics; and
    means for measuring a propagation time delay from the acoustic projector to the acoustic receiver based on the known characteristics of the transmitted acoustic waveform, wherein the transmitted acoustic waveform is greater than about one-third octave in bandwidth, and is transmitted at about a 20% duty cycle or greater during a measurement period, such that during the measurement period for the acoustic propagation time delay measurement, there is a reduced probability that other receivers of an opposing party will detect the transmission, and if detected, there is a reduced probability that the transmission would be identified as a man-made energy source.

2. The system of claim 1, further comprising multiple acoustic projectors.

3. The system of claim 2, wherein the propagation time delay is capable of being measured without reference to a time of transmission from the acoustic projectors.

4. The system of claim 1, further comprising multiple acoustic receivers.

5. The system of claim 4, wherein the propagation time delay is capable of being measured without reference to a time of transmission from the acoustic projector.

6. A system for acoustic propagation time delay measurement, comprising:
    an acoustic projector for transmitting an acoustic waveform having characteristics known to a transmitting party;
    an acoustic receiver for detecting the transmitted acoustic waveform with the known characteristics; and
    means for measuring a propagation time delay from the acoustic projector to the acoustic receiver based on the known characteristics of the transmitted acoustic waveform,
    means for measuring a Doppler shift induced by relative motion between the acoustic projector and the acoustic receiver, and
    wherein the transmitted acoustic waveform is greater than about one-third octave in bandwidth, and is transmitted at about a 20% duty cycle or greater during a measurement period.

7. The system of claim 6, further comprising multiple acoustic projectors.

8. The system of claim 6, further comprising multiple acoustic receivers.

9. A method for acoustic propagation time delay measurement, comprising:
    transmitting an acoustic waveform having characteristics known to a transmitting party;
    detecting the transmitted acoustic waveform with the known characteristics; and
    measuring a propagation time delay between the transmitting and detecting steps based on the known characteristics of the transmitted acoustic waveform,
    wherein the transmitted acoustic waveform is greater than about one-third octave in bandwidth, and is transmitted at about a 20% duty cycle or greater during a measurement period, such that during the measurement period for the propagation time delay measurement, there is a reduced probability that an opposing party will detect the transmission, and if detected, there is a reduced probability that the transmission would be identified as a man-made energy source.

10. The method of claim 9, wherein during the transmitting step, the transmitted acoustic waveform is transmitted from a plurality of acoustic projectors.

11. The method of claim 9, wherein during the detecting step, the transmitted acoustic waveform is detected by a plurality of acoustic receivers.

* * * * *